(12) United States Patent
Takano

(10) Patent No.: US 9,077,395 B2
(45) Date of Patent: Jul. 7, 2015

(54) BASE STATION, COMMUNICATION SYSTEM AND COMMUNICATION METHOD

(75) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 102 days.

(21) Appl. No.: 13/580,171

(22) PCT Filed: Feb. 21, 2011

(86) PCT No.: PCT/JP2011/053713
§ 371 (c)(1),
(2), (4) Date: Aug. 21, 2012

(87) PCT Pub. No.: WO2011/122167
PCT Pub. Date: Oct. 6, 2011

(65) Prior Publication Data
US 2012/0315891 A1    Dec. 13, 2012

(30) Foreign Application Priority Data

Mar. 31, 2010  (JP) ................................. 2010-082049

(51) Int. Cl.
  *H04B 17/00*    (2006.01)
  *H04B 7/02*     (2006.01)
  *H04B 17/21*    (2015.01)

(52) U.S. Cl.
  CPC ............. *H04B 7/024* (2013.01); *H04B 17/21* (2015.01)

(58) Field of Classification Search
  CPC ...... H04W 24/00; G01S 5/021; H04B 7/0408
  USPC .......................... 455/423, 67.11, 115.1, 226.1
  See application file for complete search history.

(56) References Cited

U.S. PATENT DOCUMENTS

2007/0117559 A1*  5/2007  Trivedi et al. ................. 455/423
2010/0020857 A1*  1/2010  Takano et al. ................. 375/219

FOREIGN PATENT DOCUMENTS

JP    2007-116489 A    5/2007
JP    2009-188546 A    8/2009

OTHER PUBLICATIONS

International Search Report Issued Mar. 22, 2011 in PCT/JP2011/053713.
"Antenna Array Calibration for TDD CoMP", Alcatel-Lucent Shanghai Bell, Alcatel-Lucent, 3GPP TSG RAN WG1 Meeting #59, R1-094623, Nov. 9-13, 2009, 5 pages.
"Antenna calibrations for TDD CoMP", Samsung, 3GPP TSG RAN WG1 Meeting #58, R1-093378, Aug. 24-28, 2009, 8 pages.

(Continued)

*Primary Examiner* — Charles Appiah
*Assistant Examiner* — Edward Zhang
(74) *Attorney, Agent, or Firm* — Oblon, McClelland, Maier & Neustadt, L.L.P.

(57) ABSTRACT

Provided is a base station including a plurality of branches that perform CoMP transmission with another base station, a multiplying unit that multiplies a transmission signal from each of the plurality of branches by a calibration coefficient of each of the plurality of branches, wherein the calibration coefficient is a coefficient obtained by adjusting an individual calibration coefficient acquired by branch calibration between the plurality of branches in the base station based on a branch calibration result between a branch of the base station and a branch of the other base station.

9 Claims, 10 Drawing Sheets

(56) References Cited

OTHER PUBLICATIONS

"Simultaneous eNB and UE Reciprocity Calibration", Alcatel-Lucent Shanghai Bell, Alcatel-Lucent, 3GPP TSG RAN WG1 Meeting #60, R1-100932, Feb. 22-26, 2010, 6 pages.

Combined Chinese Office Action and Search Report issued Sep. 1, 2014 in Patent Application No. 201180015159.5 (with English Translation).

* cited by examiner

BASE STATION, COMMUNICATION SYSTEM AND COMMUNICATION METHOD

TECHNICAL FIELD

The present invention relates to a base station, a communication system, and a communication method.

BACKGROUND ART

Recently, introduction of a $4^{th}$ generation cellular system (4G) has been under discussion in order to achieve improvement of additional performance of wireless communication. In 4G, techniques such as a relay technique, a carrier aggregation, and a coordinated multiple point transmission and reception (CoMP) are attracting attention.

The relay technique refers to a technique by which a relay node relays communication between a base station (for example, a macro cell base station) and a communication terminal, and the relay technique is important in improving the throughput at a cell edge of a base station. The carrier aggregation is a technique in which a use bandwidth is increased and a maximum throughput is improved by collectively treating a plurality of frequency bands each having a bandwidth of 20 MHz. CoMP is a technique by which a plurality of base stations collaborate with each other to perform data communication with a communication terminal, and the coverage of high-data-rate communication can be increased.

In further detail, CoMP refers to a technique by which a plurality of base stations simultaneously perform data communication with one communication terminal. According to this technique, since branches of a plurality of base stations can be used for data communication, an antenna gain and a signal to interference plus noise ratio (SINR) can be improved.

Here, it is assumed that a base station has calculated a weight of a branch based on a channel matrix of an uplink from a communication terminal and then has obtained reception directivity. In this case, when a weight of a branch is used even at the time of transmission, transmission directivity matching reception directivity is considered to be obtained. However, since a transfer function of a transmission analog unit and a transfer function of a reception analog unit of each branch are different from each other, actual transmission directivity does not match reception directivity.

Problems caused due to the difference between the transfer function of the transmission analog unit and the transfer function of the reception analog unit of each branch are solved such that each base station individually performs branch calibration and a calibration coefficient of each branch. The calibration coefficient is a coefficient used to regularize a ratio of the transfer function of the transmission analog unit and the transfer function of the reception analog unit of each branch in one base station. The branch calibration is disclosed in, for example, Patent Literature 1 and Patent Literature 2.

CITATION LIST

Patent Literature

Patent Literature 1: JP 2009-188546A
Patent Literature 2: JP 2007-116489A

SUMMARY OF INVENTION

Technical Problem

However, in the above-described individual branch calibration, it is possible to obtain the calibration coefficient used to regularize the ratio of the transfer function of the transmission analog unit and the transfer function of the reception analog unit of each branch in one base station, but it is difficult to regularize the ratios of the transfer function of the transmission analog unit and the transfer function of the reception analog unit of all branches in a plurality of base stations. For this reason, using only a method in which each base station individually performs branch calibration, it is difficult to treat all branches in a plurality of base stations performing CoMP equivalently to a plurality of branches in one device in which branch calibration has been completed. In other words, when CoMP is performed using branches of a plurality of base stations in an aggregate manner, it is difficult to match uplink directivity with downlink directivity.

Further, when each base station individually performs branch calibration, each base station individually forms directivity and performs a CoMP, but efficient communication is expected to be difficult to perform. For example, when three base stations having two branches individually perform branch calibration, it is possible to implement MIMO communication of 2×N of 3 sets (N is the number of branches at a communication terminal side), but it is difficult to implement MIMO communication of 6×N of a higher throughput.

In this regard, the present invention is made in light of the above-mentioned problems, and it is an object of the present invention to provide a base station, a communication system, and a communication method, which are novel and improved, and which are capable of efficiently performing collaborative branch calibration through branches in a plurality of base stations.

Solution to Problem

In order to solve the above-mentioned problems, according to an aspect of the present invention, there is provided a base station including a plurality of branches that perform CoMP transmission with another base station and a multiplying unit that multiplies a transmission signal from each of the plurality of branches by a calibration coefficient of each of the plurality of branches, wherein the calibration coefficient is a coefficient obtained by adjusting an individual calibration coefficient acquired by branch calibration between the plurality of branches in the base station based on a branch calibration result between a branch of the base station and a branch of the other base station.

The calibration coefficient of each of the plurality of branches may be a coefficient obtained by adjusting the individual calibration coefficient of each of the plurality of branches based on an adjustment coefficient obtained by dividing a collaborative calibration coefficient of the branch of the base station acquired by branch calibration between a branch of the base station and a branch of the other base station by the individual calibration coefficient of the branch of the base station.

The calibration coefficient of each of the plurality of branches may be a value obtained by multiplying the individual calibration coefficient of each of the plurality of branches by the adjustment coefficient.

Further, in order to solve the above-mentioned problem, according to another aspect of the present invention, there is provided a base station including a plurality of branches that perform CoMP transmission with another base station, a storage unit that stores a calibration coefficient for each of the plurality of branches, and a multiplying unit that multiplies a transmission signal from each of the plurality of branches by the calibration coefficient, wherein the calibration coefficient of each of the plurality of branches is updated by adjusting an individual calibration coefficient acquired by branch calibration between the plurality of branches in the base station based on a branch calibration result between a branch of the base station and a branch of the other base station.

The calibration coefficient of each of the plurality of branches may be updated by adjusting the individual calibration coefficient of each of the plurality of branches based on an update coefficient obtained by branch calibration between a branch of the base station and a branch of the other base station, the update coefficient may be a coefficient obtained by dividing a value obtained by multiplying a collaborative calibration coefficient of the branch of the base station acquired by branch calibration between a branch of the base station and a branch of the other base station by a correction coefficient by the individual calibration coefficient of the branch of the base station, and the correction coefficient may be a coefficient causing a collaborative calibration coefficient of the branch of the other base station acquired by branch calibration between a branch of the base station and a branch of the other base station to be used as an in-use collaborative calibration coefficient of the branch of the other base station.

Further, in order to solve the above-mentioned problem, according to another aspect of the present invention, there is provided a communication system including a plurality of base stations, each of the plurality of base stations including a plurality of branches that perform CoMP transmission with another base station, and a multiplying unit that multiplies a transmission signal from each of the plurality of branches by a calibration coefficient of each of the plurality of branches, wherein the calibration coefficient is a coefficient obtained by adjusting an individual calibration coefficient acquired by branch calibration between the plurality of branches in the base station based on a branch calibration result between a branch of the base station and a branch of the other base station.

Further, in order to solve the above-mentioned problem, according to another aspect of the present invention, there is provided a communication system including a plurality of base stations, each of the plurality of base stations including a plurality of branches that perform CoMP transmission with another base station, a storage unit that stores a calibration coefficient for each of the plurality of branches, and a multiplying unit that multiplies a transmission signal from each of the plurality of branches by the calibration coefficient, wherein the calibration coefficient of each of the plurality of branches is updated by adjusting an individual calibration coefficient acquired by branch calibration between the plurality of branches in the base station based on a branch calibration result between a branch of the base station and a branch of the other base station.

Further, in order to solve the above-mentioned problem, according to another aspect of the present invention, there is provided a communication method including, performing, by each of a plurality of base stations, each of which includes a plurality of branches and performs CoMP transmission, branch calibration between the plurality of branches in a base station, and acquiring an individual calibration coefficient corresponding to each of the plurality of branches, performing branch calibration between branches of the plurality of base stations, acquiring a calibration coefficient by adjusting the individual calibration coefficient corresponding to each of the plurality of branches based on a branch calibration result between branches of the plurality of base stations, and multiplying a transmission signal from each of the plurality of branches of the base station by the calibration coefficient of each of the plurality of branches.

Advantageous Effects of Invention

As described above, according to the present invention, it is possible to efficiently perform collaborative branch calibration through branches in a plurality of base stations.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, in this specification and the drawings, a plurality of elements having substantially the same function and structure may be distinguished from each other such that different letters are suffixed to the same reference signal. For example, a plurality of elements having substantially the same function and structure are distinguished from each other such as base stations 10A, 10B and 10C as necessary. However, when it is unnecessary to individually distinguish a plurality of elements having substantially the same function and structure, only the same reference signal is attached. For example, when it is unnecessary to particularly distinguish base stations 10A, 10B, and 10C, they are referred to simply as a base station 10.

Further, an "embodiment for embodying the invention" will be described in the following order.
1. Overall Configuration of Communication System
2. Configuration of Base Station
3. Initial Acquisition of Calibration Coefficient
4. Update of Calibration Coefficient
5. Summary 1. Overall Configuration of Communication System First, an overall configuration of a communication system 1 according to an embodiment of the present invention will be described with reference to FIG. 1.

Figure 1:
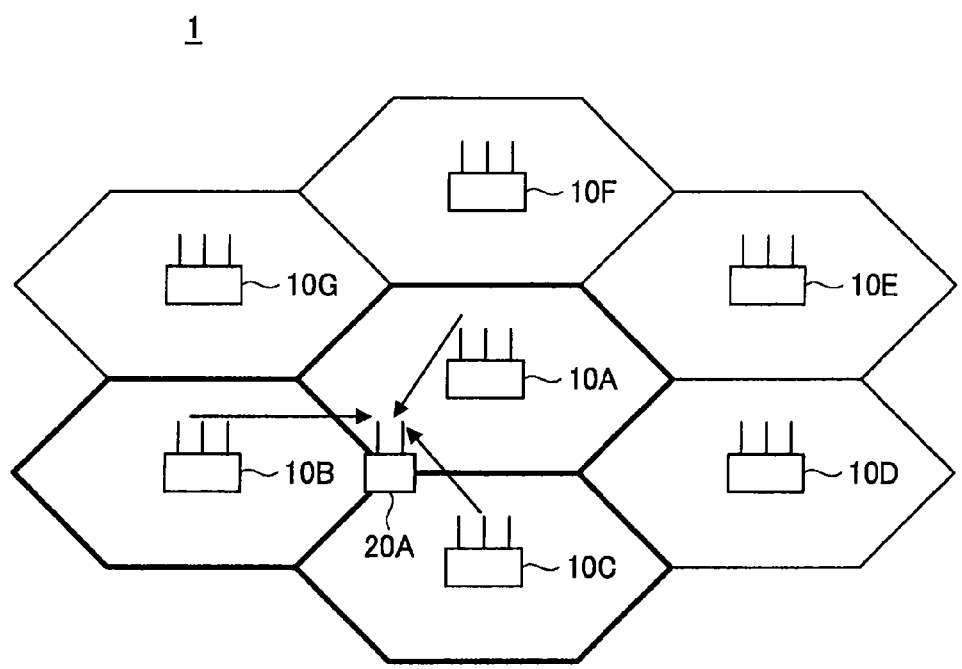
FIG. 1 is an explanatory view illustrating a configuration of a communication system 1 according to an embodiment of the present invention.

FIG. 1 is an explanatory view illustrating a configuration of the communication system 1 according to an embodiment of the present invention. As illustrated in FIG. 1, the communication system 1 according to an embodiment of the present invention includes a plurality of base stations 10 and a communication terminal 20.

The communication terminal 20 (UE: User Equipment) performs communication with the base station 10 under control of the base station 10. For example, the communication terminal 20 performs a reception process in a downlink resource block assigned by the base station 10, and performs a transmission process in an uplink resource block.

The communication terminal 20 may be an information processing device such as a personal computer (PC), a video processing device for home use (a DVD recorder, a videocassette recorder, and the like), a personal digital assistant (PDA), a game machine for home use, or a household electrical appliance. Further, the communication terminal 20 may be a mobile communication device such as a portable telephone, a personal handyphone system (PHS), a portable music reproducing device, a portable video processing device, or a portable game machine.

The base station 10 performs communication with the communication terminal 20 located within its coverage. For example, a base station 10A can perform communication with a communication terminal 20A located within the coverage of the base station 10A. In this disclosure, the description will proceed under the assumption that the base station 10 is a macro cell base station (eNodeB), but the base station 10 is not limited to the macro cell base station. For example, the base station 10 may be a pico cell/micro cell base station which is smaller in maximum transmission power than a macro cell base station or may be a relay node or a femto cell base station.

Each base station 10 is connected in a wired manner, and can exchange information with another base station 10 through wired communication. The base station 10 can implement CoMP which is expected as a next generation technology based on this information exchange. CoMP is classified roughly into joint processing, and coordinated scheduling and/or beamforming.

The joint processing of the former is a technique by which a plurality of base stations 10 simultaneously perform data communication with one communication terminal 20. An example in which the base station 10A, the base station 10B, and the base station 10C simultaneously transmit data to the communication terminal 20A as illustrated in FIG. 1 corresponds to the joint processing. According to the joint processing, branches (antennas and analog circuits) of a plurality of base stations 10 can be used for data communication, and the antenna gain and the SINR can be improved.

Further, when downlink joint processing is performed, it is necessary to distribute transmission data to be directed to the communication terminal 20 to a plurality of base stations 10 in advance using a wired communication path, called, for example, a backhaul, between the base stations 10. Further, uplink joint processing is performed by aggregating data which a plurality of base stations 10 have received from the communication terminal 20.

For example, a method of aggregating data at a bit level after decoding by each base station 10, a method of aggregating data at a soft bit stage before decoding by each base station 10, or a method of aggregating data before de-mapping by each base station 10 may be used as a data aggregation method. As an amount of aggregated data increases after a subsequent demodulation process is performed by each base station 10, an amount of data exchanged through a backhaul increases, but a performance tends to be improved.

The coordinated scheduling and/or beam forming of the latter is a technique by which data transmission is performed only by the one base station 10, and scheduling (control of deciding a resource block to be assigned to each communication terminal 20) is performed based on collaboration of a plurality of base stations 10. According to the coordinated scheduling and/or beam forming, interference between a plurality of base stations 10 can be easily avoided by scheduling adjustment.

The present invention is focused particularly on the joint processing of the former among the two types of CoMPs described above. The joint processing is classified roughly into non-coferent joint processing and coferent joint processing.

The coferent joint processing is a method in which a transmission timing of data from each base station 10 is adjusted such that phases of pieces of data arriving at the communication terminal 20 from the base station 10 match each other. On the other hand, the non-coferent joint processing is a method in which each base station 10 transmits data without adjusting a transmission timing of data from each base station 10. Thus, the coferent joint processing is higher in performance than the non-coferent joint processing. However, in order to perform the coferent joint processing, it is necessary to calculate an adjustment amount of a transmission timing of each base station 10 for each communication terminal 20, and thus there is a disadvantage that processing becomes complicated.

In this regard, it is desirable to treat all branches in the plurality of base stations 10 performing CoMP (which represents the joint processing; the same hereinafter) transmission equivalently to a plurality of branches in one device in which branch calibration has been completed. Here, when such treatment can be made, it is possible to match uplink directivity with downlink directivity when CoMP is performed using the branches of the plurality of base stations 10 in an aggregation manner, and thus it is unnecessary to adjust a transmission timing of each base station 10 for each communication terminal 20.

However, even when each base station 10 individually performs branch calibration, not all branches in the plurality of base stations 10 are treated equivalently to a plurality of branches in one device in which branch calibration has been completed. Thus, even when each base station 10 individually performs branch calibration, it is difficult to match uplink directivity with downlink directivity when CoMP is performed using the branches of the plurality of base stations 10 in an aggregation manner. The reason will be described below together with the details of individual calibration and a branch configuration of the base station 10.

(Individual Branch Calibration)

Figure 2:
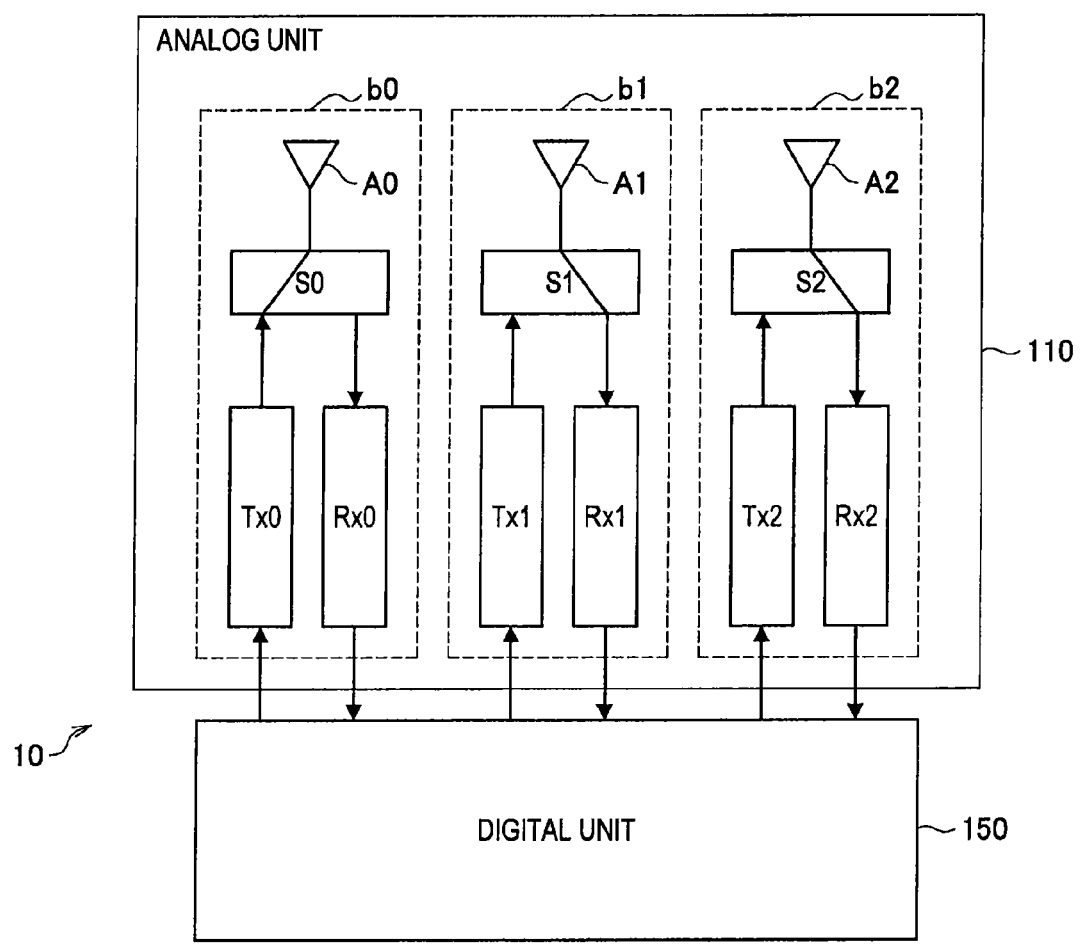
FIG. 2 is an explanatory view illustrating a configuration of a branch of the base station 10.

FIG. 2 is an explanatory view illustrating a configuration of a branch of the base station 10. As illustrated in FIG. 2, an analog unit 110 of the base station 10 includes a branch b0, a branch b1, and a branch b2. Each branch includes an antenna A, a switch S, a transmission analog unit Tx (which may include a digital to-analog (DA) converting unit), and a reception analog unit Rx (which may include an analog-to-digital (AD) converting unit). Although FIG. 2 illustrates an example in which the base station 10 includes three branches, the number of branches included in the base station 10 is not limited to three. For example, the number of branches included in the base station 10 may be two or may be four or more.

At the time of transmission, the antenna A configuring each branch is connected to the transmission analog unit Tx through the switch S. The transmission analog unit Tx executes analog processing on a transmission signal supplied from a digital unit 150, and then supplies a high frequency signal which has been subjected to the analog processing to the antenna A. The antenna A converts the high frequency signal supplied from the transmission analog unit Tx into a radio signal, and then transmits the radio signal.

Meanwhile, at the time of reception, the antenna A is connected to the reception analog unit Rx through the switch S. The antenna A converts a received radio signal into a high frequency signal, and then supplies the high frequency signal to the reception analog unit Rx. The reception analog unit Rx executes analog processing on the high frequency signal supplied from the antenna A, and then supplies the reception signal which has been subjected to the analog processing to the digital unit 150.

The antenna A, the transmission analog unit Tx, and the reception analog unit Rx have a transfer function (characteristic) that differs according to a branch. In addition, even inside the same branch, the transfer function of the transmission analog unit Tx differs in phase from the transfer function of the reception analog unit Rx. The problems caused due to the difference between the transfer function of the transmission analog unit Tx and the transfer function of the reception analog unit Rx of each branch in the base station 10 are solved such that the base station 10 individually performs branch calibration. The branch calibration individually performed by the base station 10 will be concretely described below.

Let us assume that a branch number is i, a transfer function of a transmission analog unit Tx of an $i^{th}$ branch is Tx(i), and a transfer function of a reception analog unit Rx of the $i^{th}$ branch is Rx(i). In this case, the branch calibration corresponds to a process of acquiring a calibration coefficient K(i) for each branch satisfying the following Formula 1. In a broad sense, the branch calibration corresponds to a process of complex-multiplying the transmission signal or the reception signal by the calibration coefficient K(i).

$$Tx(0)*K(0)/Rx(0)=Tx(1)*K(1)/Rx(1)=Tx(2)*K(2)/Rx(2) \quad \text{(Formula 1)}$$

Figure 3:
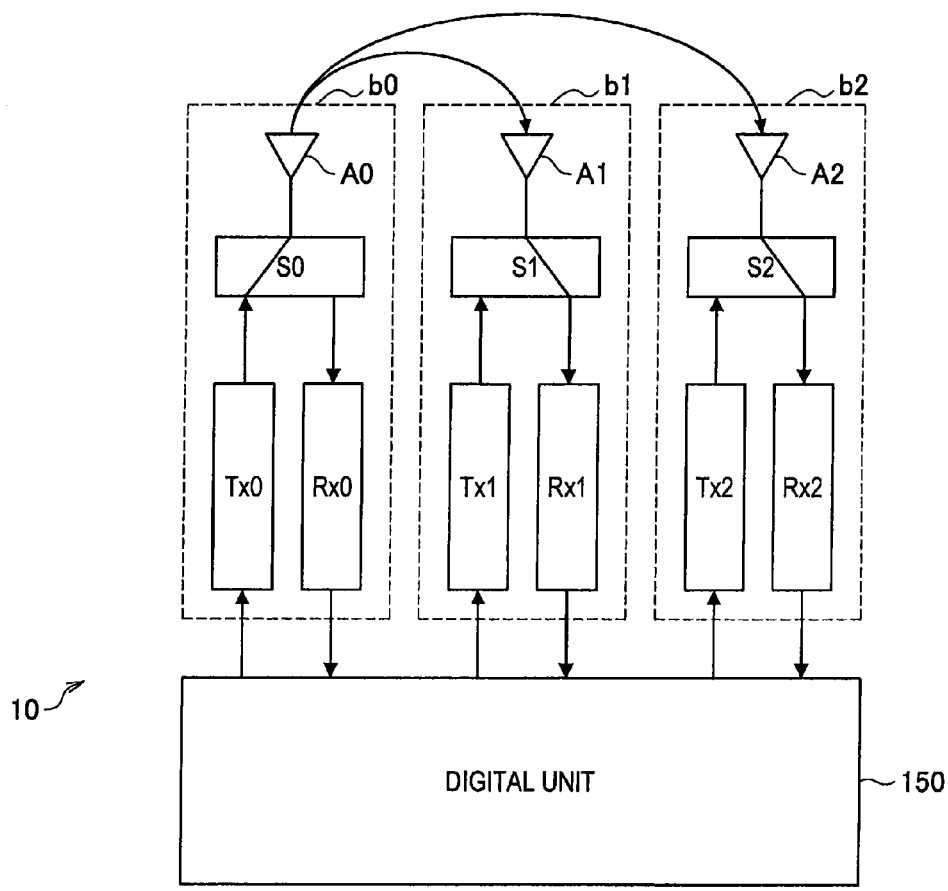
FIG. 3 is an explanatory view illustrating an individual branch calibration process.
Figure 4:
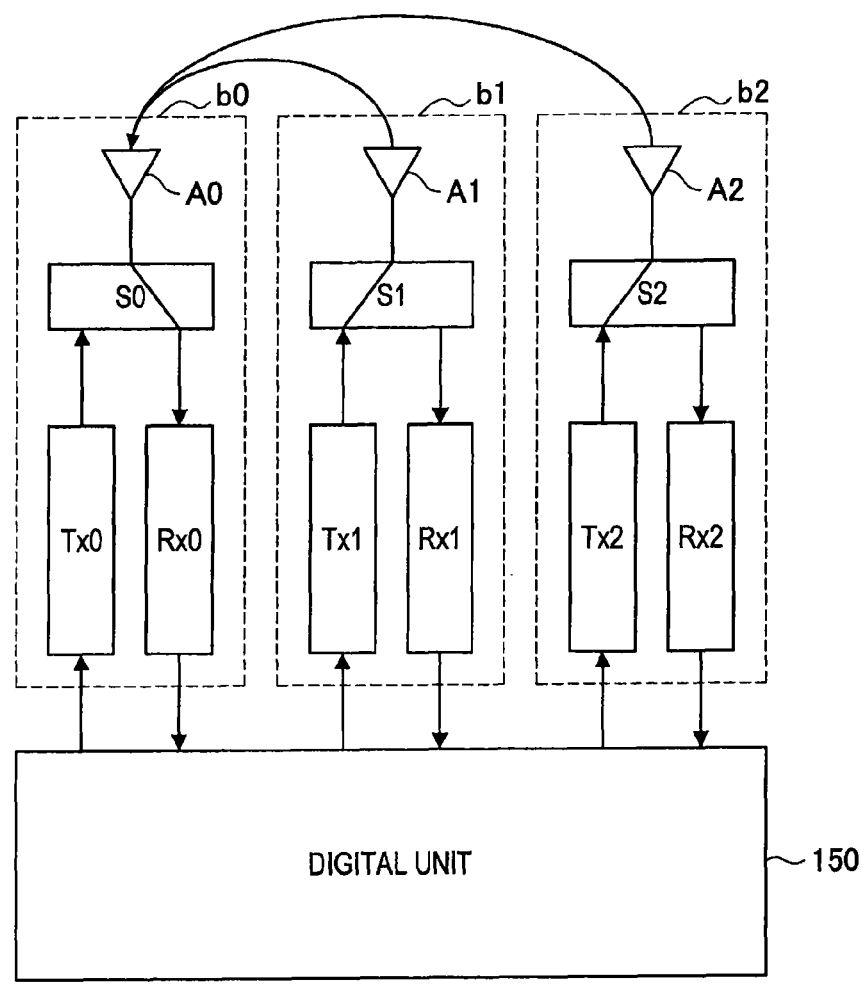
FIG. 4 is an explanatory view illustrating an individual branch calibration process.

In order to acquire the calibration coefficient K(i), first, the branch b0 transmits a radio signal, and the branch b1 and the branch b2 receive the radio signal transmitted from the branch b0 as illustrated in FIG. 3. Next, the branch b1 and the branch b2 transmit radio signals, and the branch b0 receives the radio signals transmitted from the branch b1 and the branch b2, as illustrated in FIG. 4.

As a result, the following loop-back transfer function D(i,j) is measured. The loop-back transfer function D(i,j) is a coefficient which is measured from a radio signal which passes through a transmission branch i and a transmission branch j. A branch which transmits a radio signal to a plurality of branches and receives radio signals from a plurality of branches is referred to as a "reference branch."

$$D(0,1)=Tx(0)*Rx(1)$$

$$D(0,2)=Tx(0)*Rx(2)$$

$$D(1,0)=Tx(1)*Rx(0)$$

$$D(2,0)=Tx(2)*Rx(0)$$

The base station 10 can acquire the calibration coefficient K(i) based on the loop-back transfer function D(i,j) according to the following Formula 2.

$$K(0)=1.0$$

$$K(1)=D(0,1)/D(1,0)=\{Rx(1)/Tx(1)\}*\{Tx(0)/Rx(0)\}$$

$$K(2)=D(0,2)/D(2,0)=\{Rx(2)/Tx(2)\}*\{Tx(0)/Rx(0)\} \quad \text{(Formula 2)}$$

Here, when verification of Formula 2 is performed, Formula 1 used as the calibration condition is verified to be satisfied as expressed in the following Formula 3.

$$Tx(0)*K(0)/Rx(0)=Tx(0)/Rx(0)$$

$$Tx(1)*K(1)/Rx(1)=Tx(0)/Rx(0)$$

$$Tx(2)*K(2)/Rx(2)=Tx(0)/Rx(0) \quad \text{(Formula 3)}$$

Further, as expressed in Formula 2, a calibration coefficient K(0) of the 0th branch b0 becomes 1.0 because branch calibration has been performed using the branch b0 as the reference branch. Thus, when branch calibration has been performed using the branch b1 as the reference branch, a calibration coefficient K(1) of the $1^{st}$ branch b1 becomes 1.0.

(Problem of Individual Branch Calibration)

As described above, according to individual branch calibration, it is possible to regularize the ratio of the transfer function of the transmission analog unit Tx and the transfer function of the reception analog unit Rx of all branches in each base station 10. However, even when the individual branch calibration is performed by each base station 10, since reference antennas of the individual branch calibration by the base stations 10 are different from each other, it is difficult to regularize the ratio of the transfer function of the transmission analog unit Tx and the transfer function of the reception analog unit Rx of branches in a different base station 10. In other words, it is difficult to treat all branches in a plurality of base stations 10 performing CoMP transmission equivalently to a plurality of branches in one device in which branch calibration has been completed.

Meanwhile, when the plurality of base stations 10 perform branch calibration together using the same branch as the reference branch, it is possible to regularize the ratio of the transfer function of the transmission analog unit Tx and the transfer function of the reception analog unit Rx of all branches in the plurality of base stations 10. In other words, it is considered possible to treat all branches in a plurality of base stations 10 performing CoMP transmission equivalently to a plurality of branches in one device in which branch calibration has been completed.

However, in the method in which the plurality of base stations 10 perform branch calibration together using the same branch as the reference branch, for example, it is necessary to sequentially transmit radio signals from all branches of a calibration target, and thus a commensurate time is expended. As a result, it is also feared that the branch calibration will adversely affect communication performed by the communication terminal 20.

In this context, an embodiment of the present disclosure has been made in light of the foregoing. The base station 10 according to an embodiment of the present invention can efficiently perform collaborative branch calibration with another base station that performs CoMP transmission together. The base station 10 according to an embodiment of the present invention will be described below in detail.

2. Configuration of Base Station

Figure 5:
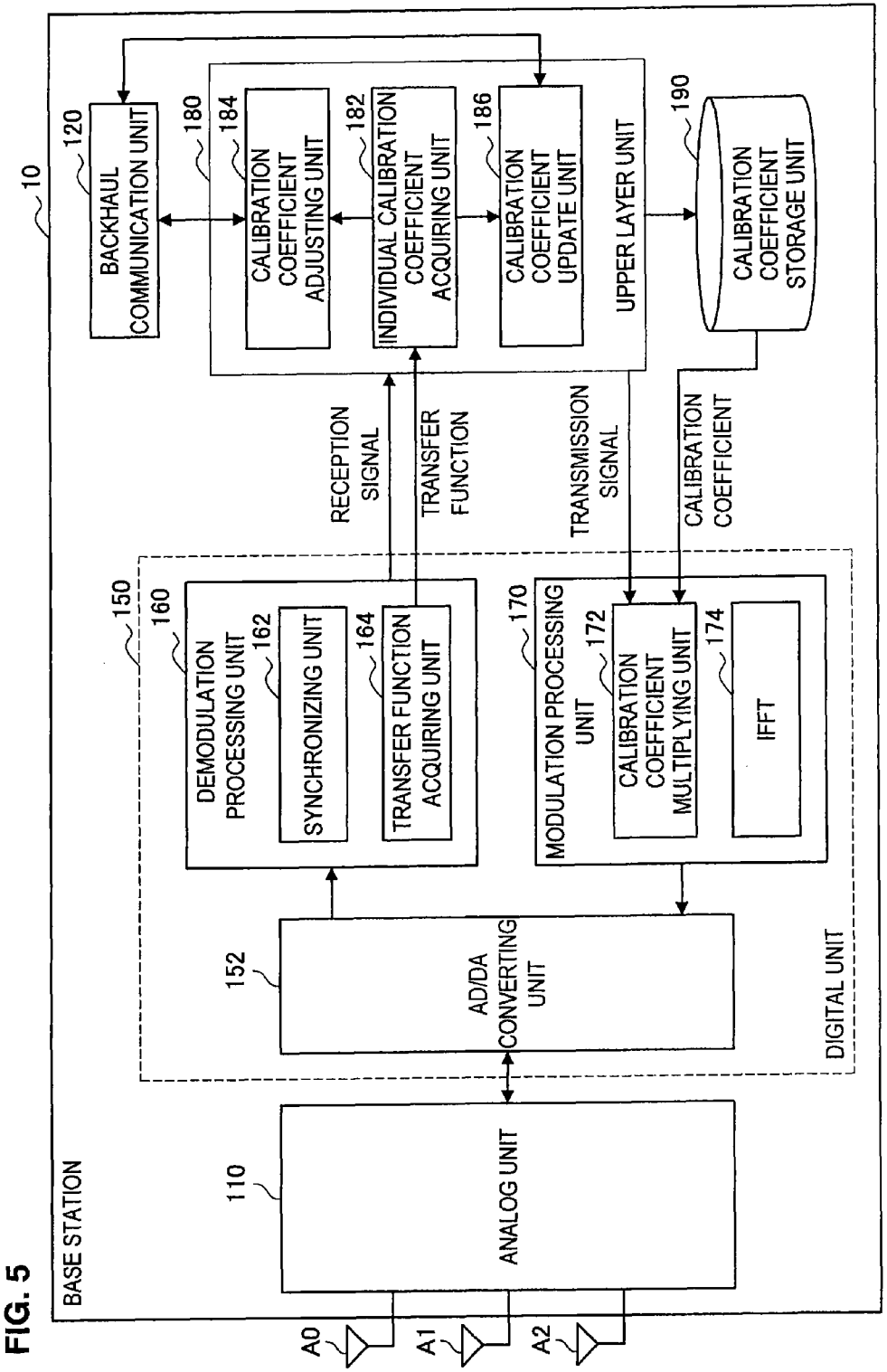
FIG. 5 is an explanatory view illustrating a configuration of the base station 10.

FIG. 5 is a functional block diagram illustrating a configuration of the base station 10 according to an embodiment of the present invention. As illustrated in FIG. 5, the base station 10 according to an embodiment of the present invention includes an analog unit 110, a backhaul communication unit 120, a digital unit 150, an upper layer unit 180, and a storage unit 190.

The backhaul communication unit 120 is an interface used to exchange information with another base station through a wired communication path. For example, the base station 10 transmits/receives a loop-back transfer function obtained in the process of collaborative branch calibration or calibration coefficient update, which will be described later, to/from another base station through the backhaul communication unit 120.

The digital unit 150 includes an AD/DA converting unit 152, a demodulation processing unit 160, and a modulation processing unit 170 as illustrated in FIG. 5. The components of the digital unit 150 may be disposed for each branch.

The AD/DA converting unit 152 converts a reception signal of an analog format supplied from the analog unit 110 into a signal of a digital format, and converts a transmission signal of a digital format supplied from the modulation processing unit 170 into a signal of an analog format.

The demodulation processing unit 160 performs various kinds of processing to demodulate the reception signal supplied from the AD/DA converting unit 152. For example, the demodulation processing unit 160 performs a Fourier transform, de-mapping, error correction, or the like on the reception signal. The demodulation processing unit 160 includes a synchronizing unit 162 and a transfer function acquiring unit 164.

The synchronizing unit 162 acquires synchronization with the reception signal based on a synchronous signal included in the reception signal. The transfer function acquiring unit 164 acquires a loop-back transfer function corresponding to a signal transmission path based on the radio signal received in the process of collaborative branch calibration or calibration coefficient update.

The modulation processing unit 170 performs various kinds of processing to modulate a transmission signal supplied from an upper layer 180. For example, the modulation processing unit 170 performs mapping of a transmission signal, an inverse Fourier transform in an IFFT 174, addition of a guide interval, and the like. A calibration coefficient multiplying unit 172 (multiplying unit) of the modulation processing unit 170 complex-multiplies a transmission signal from each branch by a calibration coefficient of each branch read from the storage unit 190 in a frequency domain.

The upper layer unit 180 includes an individual calibration coefficient acquiring unit 182, a calibration coefficient adjusting unit 184, and a calibration coefficient update unit 186.

The individual calibration coefficient acquiring unit 182 acquires a calibration coefficient K for each branch in the base station 10 through the calculation described in "Individual Branch Calibration." In the following, the calibration coefficient K for each branch in the base station 10 acquired by the individual branch calibration is referred to as an "individual calibration coefficient."

The calibration coefficient adjusting unit 184 initially acquires a calibration coefficient used when the base station 10 performs CoMP with another base station by adjusting the individual calibration coefficient acquired by the individual calibration coefficient acquiring unit 182. Although the details will be described in "3. Initial Acquisition of Calibration Coefficient," the calibration coefficient adjusting unit 184 adjusts the individual calibration coefficient based on a branch calibration result between any one branch of the base station 10 and a branch of another base station. The calibration coefficient obtained through this adjustment is recorded in the storage unit 190.

The calibration coefficient update unit 186 updates the calibration coefficient for CoMP acquired by the calibration coefficient adjusting unit 184. This is because the accuracy of the calibration coefficient is considered to be obsolete after a half day due to a change in temperature or the like. However, it is difficult for all the base stations 10 performing CoMP to simultaneously update the calibration coefficient. Further, when the calibration coefficients of some of the base station 10s are updated, mismatching with the calibration coefficient of another base station may occur.

For example, even when some of the base stations 10 update the calibration coefficient using the same branch as at the time of initial acquisition as the reference branch, the transfer function of the reference branch may change. In this case, mismatching occurs between the updated calibration coefficient of some of the base stations 10 and the existing calibration coefficient of another base station.

In this regard, the calibration coefficient update unit 186 can update the calibration coefficient by an adjustment based on the branch calibration result between any one branch of the base station 10 and a branch of another base station. The calibration coefficient update will be described in detail in "4. Update of Calibration Coefficient."

3. Initial Acquisition of Calibration Coefficient

The configuration of the base station 10 according to an embodiment of the present invention has been described so far. Next, an initial acquisition method of the calibration coefficient used when the base station 10 performs CoMP with another base station will be described in detail.

First, the terminology related to the calibration coefficient initial acquisition is defined as follows.

Individual Calibration Coefficient (i,j)

A calibration coefficient of an $i^{th}$ branch of a base station 10$i$, which is acquired by performing branch calibration closed by the base station 10$i$.

Reference Branch of Individual Calibration

A reference branch set when branch calibration closed by the base station 10$i$ is performed.

Forward Loop-Back Transfer Function D(i,reference)(i,j)

A loop-back transfer function from the reference branch of the base station 10$i$ to a $j^{th}$ branch of the base station 10$i$.

Backward Loop-Back Transfer Function D(i,j)(i,reference)

A loop-back transfer function from the $j^{th}$ branch of the base station 10$i$ to the reference branch of the base station 10$i$.

Use Branch of Each Base Station of Collaborative Calibration

A branch selected for each base station when a plurality of base stations perform collaborative branch calibration. This branch may be different from the reference branch of the individual calibration.

Reference Branch of Collaborative Calibration

A reference branch set when a plurality of base stations perform collaborative branch calibration. This branch may be one branch set for each communication terminal 20 or for each relay node.

Forward Loop-Back Transfer Function D(reference)(i,use)

A loop-back transfer function from the reference branch of collaborative calibration to the use branch of the base station 10$i$ Backward Loop-Back Transfer Function D(i,use)(reference)

A loop-back transfer function from the use branch of the base station 10$i$ to the reference branch of collaborative calibration.

Collaborative Calibration Coefficient (i,use)

A calibration coefficient of the use branch of the base station 10$i$ acquired by collaborative calibration Adjustment Coefficient (i)

A coefficient used to adjust the individual calibration coefficient (i,j) of the base station $10i$ and acquire a final calibration coefficient. The adjustment coefficient (i) is calculated according to the following Formula 4. In Formula 4, the $j^{th}$ branch is the same as the use branch of the collaborative calibration.

Adjustment coefficient (i)=collaborative calibration coefficient (i,use)/the individual calibration coefficient (i,j)　　　(Formula 4)

Calibration Coefficient (i,j)

A $j^{th}$ calibration coefficient of the base station $10i$, which is used when the base station $10i$ performs CoMP with another base station. The calibration coefficient (i,j) is calculated according to the following Formula 5.

Calibration coefficient (i,j)=individual calibration coefficient (i,j)*adjustment coefficient (i)　　　(Formula 5)

(Outline)

Figure 6:
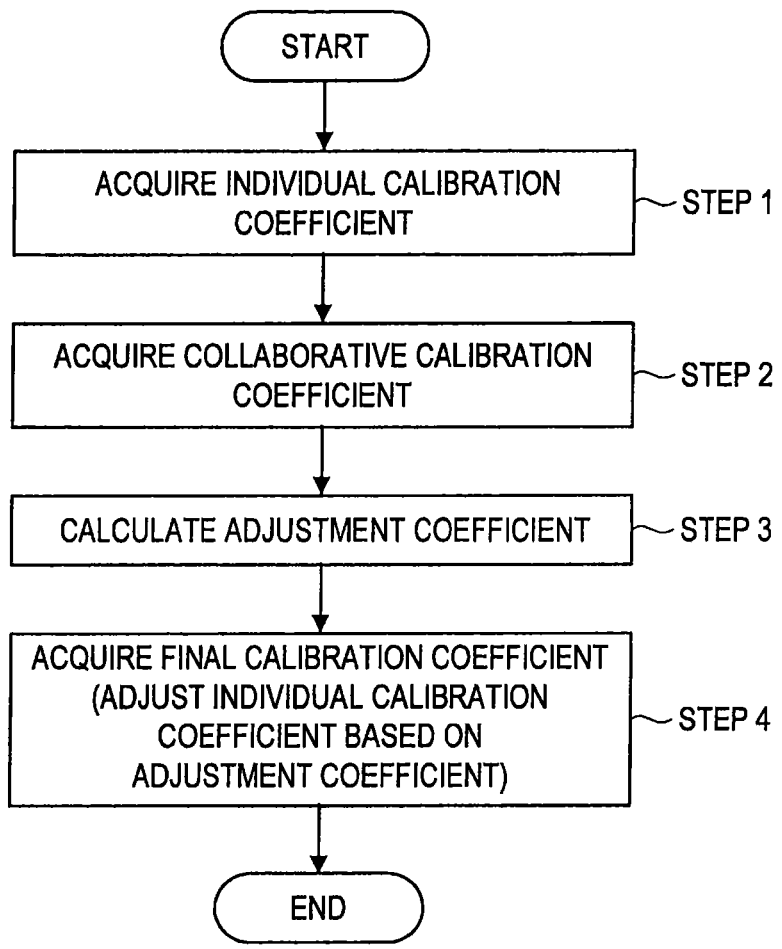
FIG. 6 is a flowchart illustrating an operation of the base station 10.

Next, an outline of a calibration coefficient acquisition method will be described with reference to FIG. 6. FIG. 6 is a flowchart illustrating a calibration coefficient acquisition method. First, each of a plurality of base stations 10 performing CoMP acquires the individual calibration coefficient, for example, by the method described in "Individual Branch Calibration" (step 1).

Thereafter, the plurality of base stations 10 perform calibration in collaboration with each other, and acquire the collaborative calibration coefficient (step 2). This collaborative calibration is branch calibration performed between the use branch selected one by one by each base station 10 and the reference branch. The base stations 10 exchange the loop-back transfer function necessary to acquire the collaborative calibration coefficient through the backbone communication unit 120. The number of use branches selected by each base station 10 may be two or more rather than one.

Subsequently, each base station 10 calculates the adjustment coefficient based on the individual calibration coefficient and the collaborative calibration coefficient according to Formula 4 (step 3). Further, each base station 10 acquires the final calibration coefficient by complex multiplying the individual calibration coefficient of each branch by the adjustment coefficient calculated in step 3 as expressed in Formula 5 (step 4). Each step will be described below in detail using a concrete example.

(Step 1: Acquisition of Individual Calibration Coefficient)

Figure 7:
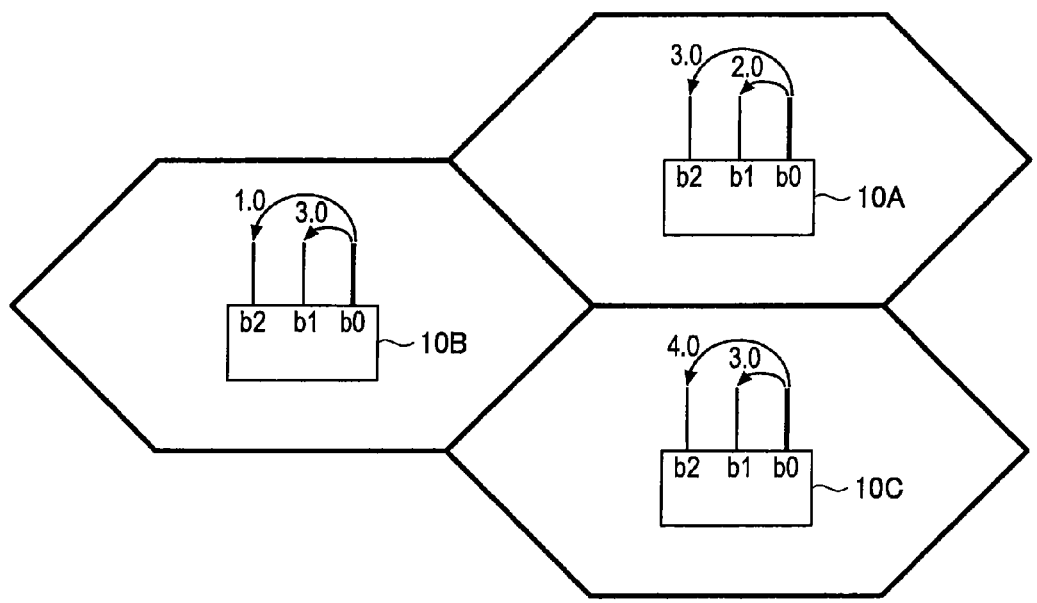
FIG. 7 is an explanatory view illustrating a process of initially acquiring calibration for CoMP.
Figure 8:
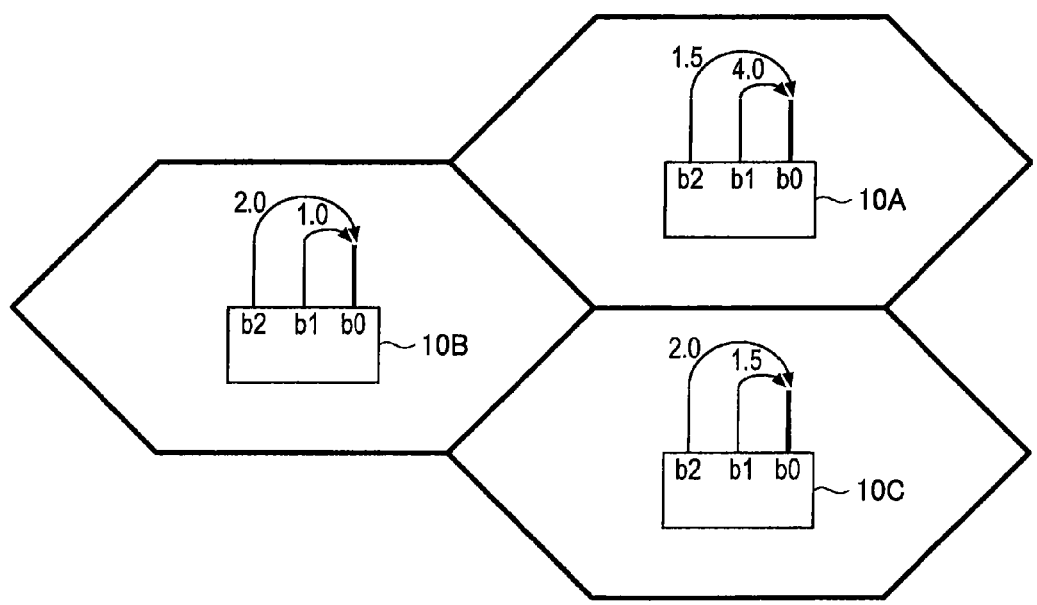
FIG. 8 is an explanatory view illustrating a process of initially acquiring calibration for CoMP.

FIGS. 7 and 8 are diagrams for describing an individual calibration process. As illustrated in FIG. 7, each of the base stations 10A to 10C performing CoMP first transmits a radio signal through the branch b0 selected as the reference branch, and receives the radio signal through the branches b1 and b2. Through this operation, each of the base stations 10A to 10C can acquire the forward loop-back transfer function D(i,reference)(i,j). In this example in which the branch b0 is selected as the reference branch, "reference" in (i,reference) corresponds to "0," and "j" in (i,j) corresponds to "1" or "2."

Subsequently, each of the base stations 10A to 10C transmits the radio signal through the branches b1 and b2 and receives the radio signal through the branch b0 as illustrated in FIG. 8. Through this operation, each of the base stations 10A to 10C can acquire the backward loop-back transfer function D(i,j)(i,reference).

Then, each of the base stations 10A to 10C acquires the individual calibration coefficient (i,j) according to the following Formula 6.

Individual calibration coefficient (i,j)= D(i,reference)(i,j)/D(i,j)(i,reference)　　　(Formula 6)

Here, it is assumed that the following values have been obtained as the forward loop-back transfer function D(i,reference)(i,j) and the backward loop-back transfer function D(i,j)(i,reference) as illustrated in FIGS. 7 and 8. In the following, for the sake of simplification of description, each loop-back transfer function D is a real number, but the loop-back transfer function D may be a complex number.

D(A,reference)(A,1)=2.0
D(A,reference)(A,2)=3.0
D(A,1)(A,reference)=4.0
D(A,2)(A,reference)=1.5
D(B,reference)(B,1)=2.0
D(B,reference)(B,2)=1.0
D(B,1)(B,reference)=1.0
D(B,2)(B,reference)=2.0
D(C,reference)(C,1)=3.0
D(C,reference)(C,2)=4.0
D(C,1)(C,reference)=1.5
D(C,2)(C,reference)=2.0

In this case, the individual calibration coefficient (i,j) is calculated based on Formula 6 as follows.

Individual Calibration Coefficient $(A, 0) = 1.0$ $(A, 1) = D(A, \text{reference})(A, 1)/D(A, 1)(A, \text{reference})$
$= 2.0/4.0$
$= 0.5$ $(A, 2) = D(A, \text{reference})(A, 2)/D(A, 2)(A, \text{reference})$
$= 3.0/1.5$
$= 2.0$ $(B, 0) = 1.0$ $(B, 1) = D(B, \text{reference})(B, 1)/D(B, 1)(B, \text{reference})$
$= 2.0/1.0$
$= 2.0$ $(B, 2) = D(B, \text{reference})(B, 2)/D(B, 2)(B, \text{reference})$
$= 1.0/2.0$
$= 0.5$ $(C, 0) = 1.0$ $(C, 1) = D(C, \text{reference})(C, 1)/D(C, 1)(C, \text{reference})$
$= 3.0/1.5$
$= 2.0$ $(C, 2) = D(C, \text{reference})(C, 2)/D(C, 2)(C, \text{reference})$
$= 4.0/2.0$
$= 2.0$ (Step 2: Acquisition of Collaborative Calibration Coefficient)

Figure 9:
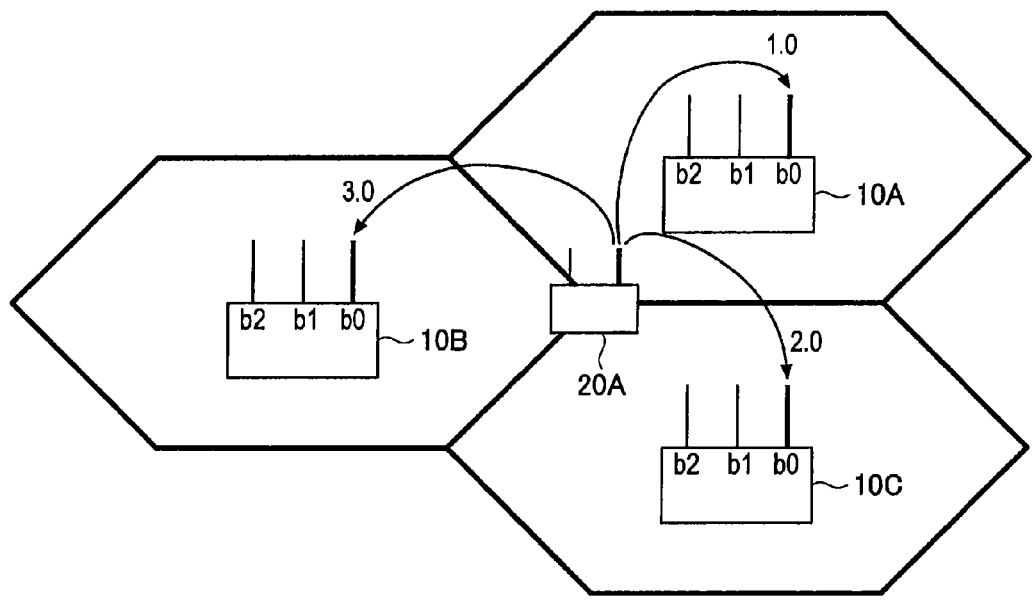
FIG. 9 is an explanatory view illustrating a process of initially acquiring calibration for CoMP.
Figure 10:
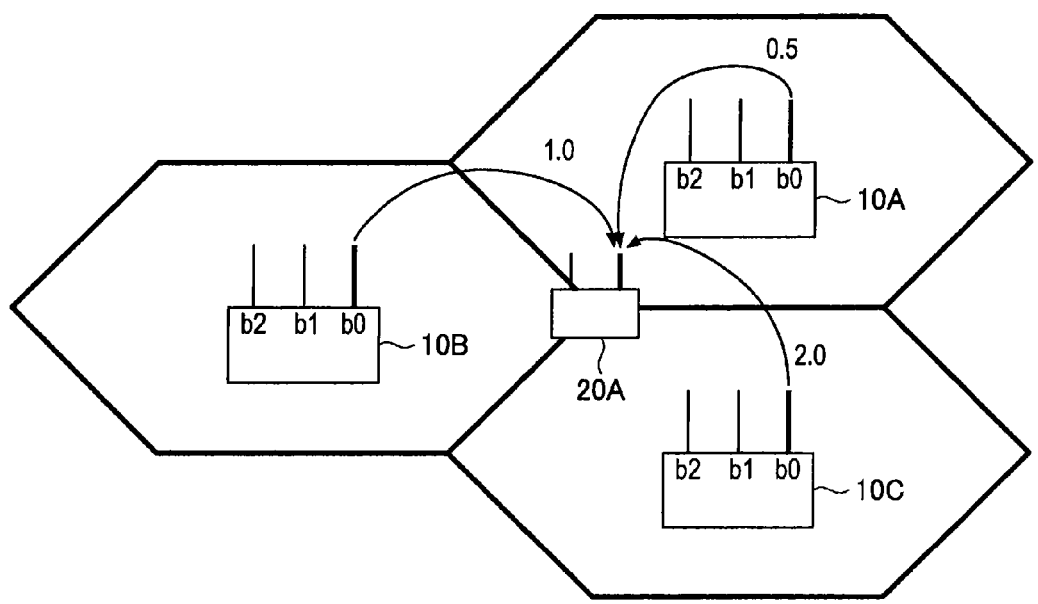
FIG. 10 is an explanatory view illustrating a process of initially acquiring calibration for CoMP.

FIG. 9 and FIG. 10 are diagrams for describing a collaborative calibration process. As illustrated in FIG. 9, the use antenna b0 selected from each of the base stations 10A to 10C performing CoMP first receives the radio signal transmitted from the branch of the communication terminal 20A selected as the reference branch. Through this operation, the base stations 10A to 10C can acquire the forward loop-back transfer function D(reference)(i,use).

Subsequently, each of the base stations 10A to 10C transmits the radio signal to the reference branch of the communication terminal 20A through the use antenna b0 as illustrated in FIG. 10. Through this operation, the communication terminal 20A can acquire the backward loop-back transfer function D(i,use)(reference).

Then, each of the base stations 10A to 10C acquires the collaborative calibration coefficient (i,j) according to the following Formula 7.

Collaborative calibration coefficient (i,use)=D(reference)(i,use)/D(i,use)(reference)　　　(Formula 7)

The loop-back transfer functions are dispersively acquired by the base stations 10A to 10C and the communication terminal 20A. Thus, each of the base stations 10A to 10C may exchange the loop-back transfer function necessary to acquire the collaborative calibration coefficient using a backhaul or wireless communication.

Here, it is assumed that the following values have been acquired as the forward loop-back transfer function D(reference)(i,use) and the backward loop-back transfer function D(i,use)(reference) as illustrated in FIGS. 9 and 10.

D(reference)(A,0)=1.0
D(A,0)(reference)=0.5
D(reference)(B,0)=3.0
D(B,0)(reference)=1.0
D(reference)(C,0)=2.0
D(C,0)(reference)=2.0

In this case, the collaborative calibration coefficient (i,use) is calculated based on Formula 7 as follows.

Collaborative Calibration Coefficient $$(A, 0) = D(\text{reference})(A, 0) / D(A, 0)(\text{reference})$$
$$= 1.0/0.5$$
$$= 2.0$$

$$(B, 0) = D(\text{reference})(B, 0) / D(B, 0)(\text{reference})$$
$$= 3.0/1.0$$
$$= 3.0$$

$$(C, 0) = D(\text{reference})(C, 0) / D(C, 0)(\text{reference})$$
$$= 2.0/2.0$$
$$= 1.0$$

(Step 3: Calculation of Adjustment Coefficient)

Each base station 10 calculates the adjustment coefficient (i) according to Formula 4. Specifically, when the individual calibration coefficient (i,j) and the collaborative calibration coefficient (i,use) have been obtained, each base station 10 calculates the adjustment coefficient (i) as follows.

$$\text{Adjustment coefficient } (A) =$$
$$\text{collaborative calibration coefficient } (A, 0) /$$
$$\text{individual calibration coefficient } (A, 0) = 2.0/1.0 = 2.0$$

$$\text{Adjustment coefficient } (B) =$$
$$\text{collaborative calibration coefficient } (B, 0) /$$
$$\text{individual calibration coefficient } (B, 0) = 3.0/1.0 = 3.0$$

$$\text{Adjustment coefficient } (C) =$$
$$\text{collaborative calibration coefficient } (C, 0) /$$
$$\text{individual calibration coefficient } (C, 0) = 1.0/1.0 = 1.0$$

(Step 4: Acquisition of Final Calibration Coefficient)

Each base station 10 calculates the final calibration coefficient (i,j) of each branch according to Formula 5. Specifically, when the individual calibration coefficient (i,j) and the adjustment coefficient (i) have been obtained, each base station 10 calculates the final calibration coefficient (i,j) of each branch as follows.

Final Calibration Coefficient $$(A, 0) = \text{individual calibration coefficient } (A, 0) *$$
$$\text{adjustment coefficient } (A) = 1.0 * 2.0 = 2.0$$

$$(A, 1) = \text{individual calibration coefficient } (A, 1) *$$
$$\text{adjustment coefficient } (A) = 0.5 * 2.0 = 1.0$$

$$(A, 2) = \text{individual calibration coefficient } (A, 2) *$$
$$\text{adjustment coefficient } (A) = 2.0 * 2.0 = 4.0$$

$$(B, 0) = \text{individual calibration coefficient } (B, 0) *$$
$$\text{adjustment coefficient } (B) = 1.0 * 3.0 = 3.0$$

$$(B, 1) = \text{individual calibration coefficient } (B, 1) *$$
$$\text{adjustment coefficient } (B) = 2.0 * 3.0 = 6.0$$

$$(B, 2) = \text{individual calibration coefficient } (B, 2) *$$
$$\text{adjustment coefficient } (B) = 0.5 * 3.0 = 1.5$$

$$(C, 0) = \text{individual calibration coefficient } (C, 0) *$$
$$\text{adjustment coefficient } (C) = 1.0 * 1.0 = 1.0$$

$$(C, 1) = \text{individual calibration coefficient } (C, 1) *$$
$$\text{adjustment coefficient } (C) = 2.0 * 1.0 = 2.0$$

$$(C, 2) = \text{individual calibration coefficient } (C, 2) *$$
$$\text{adjustment coefficient } (C) = 2.0 * 1.0 = 2.0$$

4. Update of Calibration Coefficient

As described above, a plurality of base stations 10 perform branch calibration in collaboration with each other, and thus it is possible to acquire the matching calibration coefficient among all branches of a plurality of base stations 10. Next, a method of updating some calibration coefficients will be described in detail.

First, the terminology related to calibration coefficient updating is defined as follows.

Target Base Station

A base station whose calibration coefficient is to be updated.

Cooperative Base Station

A base station that cooperates to update the calibration coefficient of the target base station.

Individual Calibration Coefficient (i,j)

A calibration coefficient of the i-th branch of the base station 10i, which is acquired by performing branch calibration closed by the base station 10i.

Forward Loop-Back Transfer Function D(reference)(i,use)

A loop-back transfer function from the reference branch of collaborative calibration to the use branch of the base station 10i Backward Loop-Back Transfer Function D(i,use)(reference)

A loop-back transfer function from the use branch of the base station 10i to the reference branch of collaborative calibration.

Collaborative Calibration Coefficient (i,use)

A calibration coefficient of the use branch of the base station 10i, which is acquired by collaborative calibration.

Correction Coefficient

A coefficient used to match the collaborative calibration coefficient (i,use) of the use branch of the cooperative base station with the current calibration coefficient of the use branch of the cooperative base station.

Corrected Collaborative Calibration Coefficient (i,use)

A collaborative calibration coefficient (i,use) corrected by the correction coefficient. Specifically, a value obtained by multiplying the correction coefficient by the collaborative calibration coefficient (i,use).

Update Coefficient (i)

A coefficient used to adjust the individual calibration coefficient (i,j) of the target base station, whereby the updated calibration coefficient is acquired. The update coefficient (i) is calculated according to the following Formula 8. In Formula 8, the $j^{th}$ branch is the same as the use branch of the collaborative calibration.

Update coefficient (*i*)=corrected collaborative calibration coefficient (*i*,use)/individual calibration coefficient (*i,j*)     (Formula 8)

Calibration Coefficient (i,j)

A $j^{th}$ calibration coefficient of the base station 10i used when the base station 10i performs CoMP with another base station. The calibration coefficient (i,j) is calculated according to the following Formula 9.

Calibration coefficient (*i,j*)=individual calibration coefficient (*i,j*)*update coefficient (*i*)     (Formula 9)

(Outline)

Figure 11:
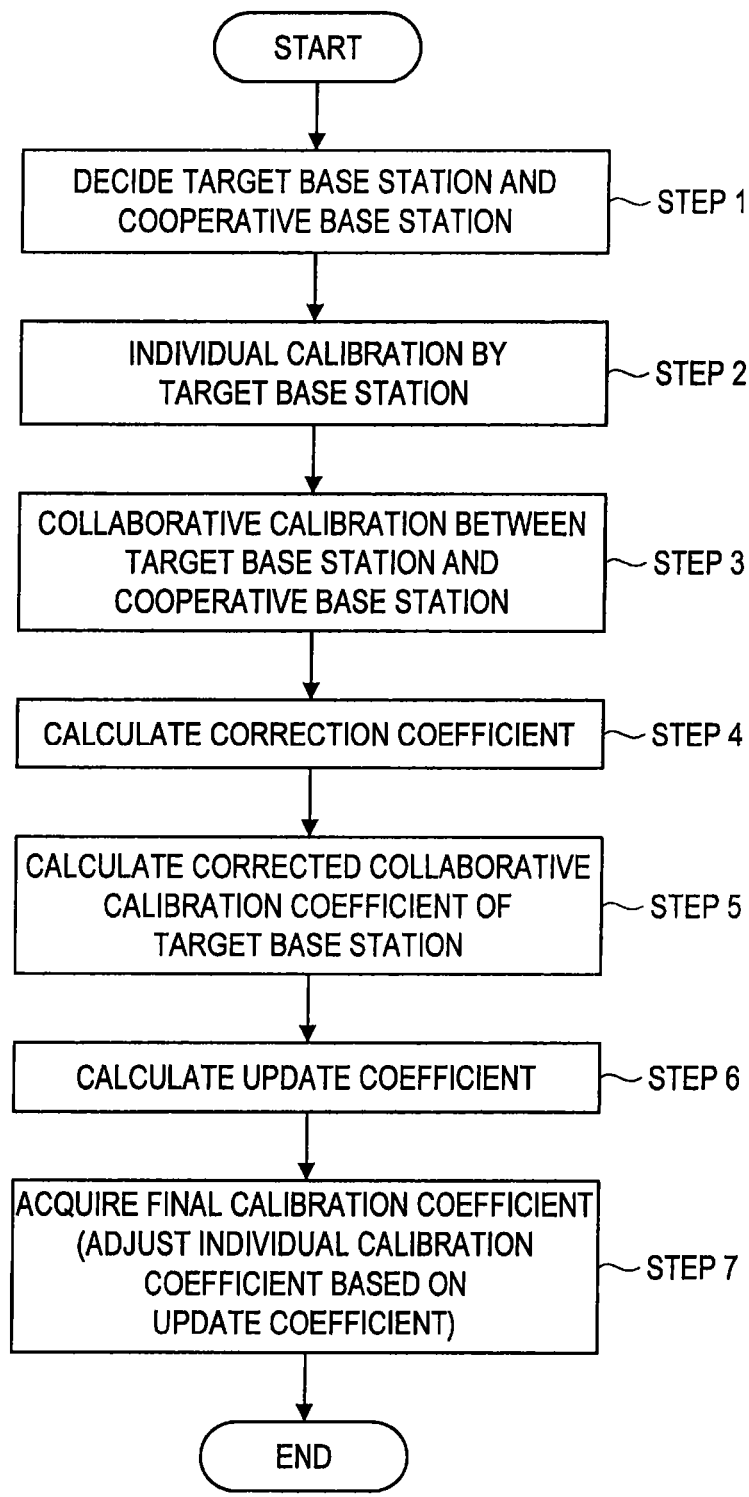
FIG. 11 is a flowchart illustrating an operation of the base station 10.

Next, an outline of a calibration coefficient update method will be described with reference to FIG. 11. FIG. 11 is a flowchart illustrating a calibration coefficient update method. As illustrated in FIG. 11, first, a target base station whose calibration coefficient for CoMP needs to be updated and a cooperative base station that cooperates in updating are decided (step 1). Subsequently, the target base station performs individual calibration, and acquires the individual calibration coefficient of each branch (step 2).

Thereafter, the target base station and the cooperative base station perform calibration in collaboration with each other, and acquire the collaborative calibration coefficient (step 3). This collaborative calibration is branch calibration performed between the use branch selected individually by the target base station and the cooperative base station and the reference branch.

Subsequently, the cooperative base station calculates the correction coefficient used to match the collaborative calibration coefficient of the use branch of the cooperative base station acquired in step 3 with the calibration coefficient of the use branch currently stored in the storage unit 190 (step 4).

Further, the target base station multiplies the collaborative calibration coefficient of the use branch of the target base station acquired in step 3 by the correction coefficient calculated in step 4, and calculates the corrected collaborative calibration coefficient (step 5). Then, the target base station calculates the update coefficient according to Formula 8 (step 6), and then acquires the final calibration coefficient according to Formula 9 (step 7). Each step will be described below in detail using a concrete example.

(Step 1: Decision of Target Base Station and Cooperative Base Station)

The target base station is the base station 10 whose calibration coefficient for CoMP is to be updated as described above. Here, the accuracy of the calibration coefficient degrades with the lapse of time. In this regard, the base station 10 may decide itself as the target base station when a predetermined time elapses after the calibration coefficient for CoMP is acquired or updated. Further, the base station 10 may decide a base station present at the position at which collaborative calibration with the target base station is performed as the cooperative base station. In the following, the process will be described under the assumption that among the base stations 10A to 10C whose calibration coefficients are acquired by the process illustrated FIGS. 9 and 10, the base station 10A is decided as a target cell, and the base station 10C is decided as a cooperative cell.

(Step 2: Individual Calibration by Target Base Station)

The base station 10A decided as the target cell base station acquires the forward loop-back transfer function D(A,reference)(A,j) and the backward loop-back transfer function D(A,j)(A,reference), and then acquires the individual calibration coefficient (A,j) based on the functions. Here, it is assumed that the following individual calibration coefficient (A,j) has been acquired. As will be described below, the individual calibration coefficient (A,j) acquired at the time of update is expected to be different from the individual calibration coefficient (A,j) acquired at the time of initial acquisition.

Individual Calibration Coefficient (A,0)=1.0

(A,1)=0.6

(A,2)=2.2

(Step 3: Collaborative Calibration)

Figure 12:
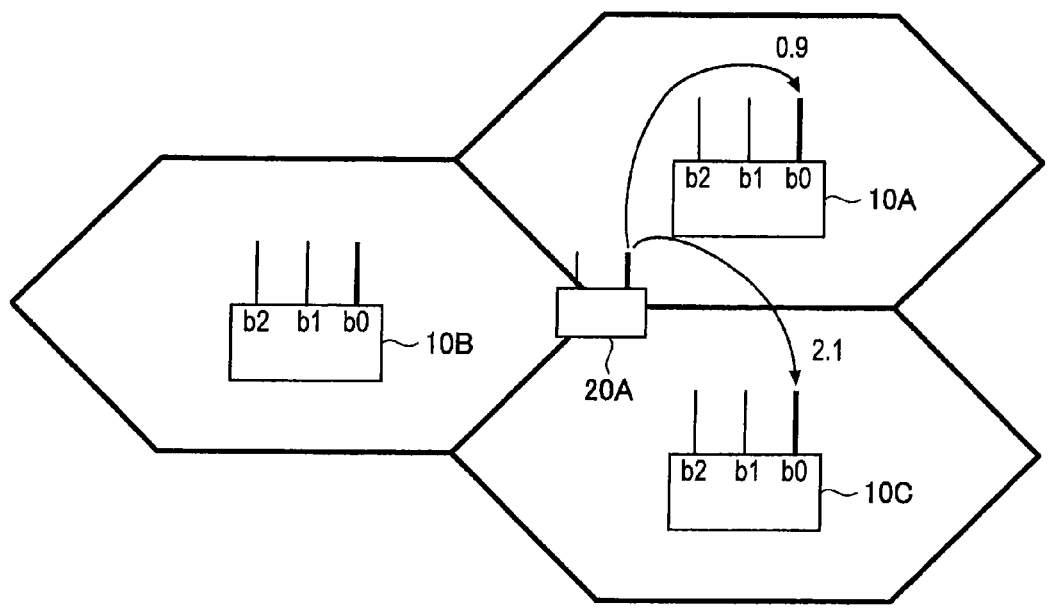
FIG. 12 is an explanatory view illustrating a process of updating calibration for CoMP.
Figure 13:
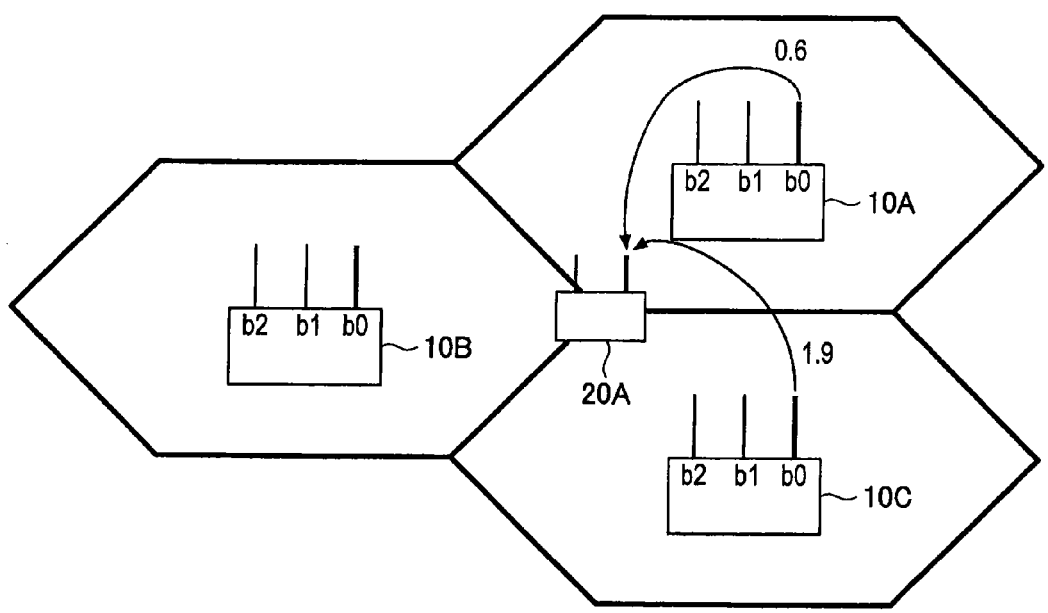
FIG. 13 is an explanatory view illustrating a process of updating calibration for CoMP.

FIG. 12 and FIG. 13 are diagrams for describing a collaborative calibration process. As illustrated in FIG. 12, the use antennas b0 selected from the base station 10A serving as the target base station and the cooperative base station 10C first receive the radio signal transmitted from the branch of the communication terminal 20A selected as the reference branch. Through this operation, the base stations 10A and 10C can acquire the forward loop-back transfer function D(reference)(i,use).

Subsequently, each of the base stations 10A and 10C transmits the radio signal to the reference branch of the communication terminal 20A through the use antenna b0 as illustrated in FIG. 13. Through this operation, the communication terminal 20A can acquire the backward loop-back transfer function D(i,use)(reference).

Then, each of the base stations 10A and 10C acquires the collaborative calibration coefficient (i,j) according to Formula 7. The loop-back transfer functions are dispersively acquired by the base stations 10A and 10C and the communication terminal 20A. Thus, the base stations 10A and 10C may exchange the loop-back transfer function necessary to acquire the collaborative calibration coefficient using a backhaul or wireless communication.

Here, as illustrated in FIGS. 12 and 13, it is assumed that the following values have been obtained as the forward loop-back transfer function D(reference)(i,use) and the backward loop-back transfer function D(i,use)(reference).

D(reference)(A,0)=0.9

D(A,0)(reference)=0.6

D(reference)(C,0)=2.1

D(C,0)(reference)=1.9

In this case, the collaborative calibration coefficient (i,use) is calculated based on Formula 7 as follows.

Collaborative Calibration Coefficient $$(A, 0) = D(\text{reference})(A, 0) / D(A, 0)(\text{reference}) = 0.9 / 0.6 = 1.5$$

$$(C, 0) = D(\text{reference})(C, 0) / D(C, 0)(\text{reference}) = 2.1 / 1.9 \approx 1.1$$

(Step 4: Calculation of Correction Coefficient)

The base station 10C serving as the cooperative base station calculates a coefficient used to match the collaborative calibration coefficient (C,0) of the use branch of the cooperative base station acquired in step 3 with the current calibration coefficient (C,0) of the use branch of the base station 10C. Here, when the current calibration coefficient (C,0) of the use branch of the base station 10C is "1.0," the correction coefficient is calculated as follows.

Correction coefficient=current calibration coefficient (C,0)/collaborative calibration coefficient (C,0)≈0.909

(Step 5: Calculation of Corrected Collaborative Calibration Coefficient)

The base station 10A serving as the target base station multiplies the collaborative calibration coefficient (A,0) of the use branch of the base station 10A acquired in step 3 by the correction coefficient calculated in step 4, and calculates the corrected collaborative calibration coefficient (i,use). Specifically, the corrected collaborative calibration coefficient (i,use) is calculated as follows.

$$\text{Corrected collaborative calibration } (i, 0) =$$
$$\text{collaborative calibration coefficient } (A, 0) * \text{correction coefficient} =$$
$$1.5 * 0.909 \approx 1.36$$

(Step 6: Calculation of Update Coefficient)

The base station 10A calculates the update coefficient (A) according to Formula 8 based on the corrected collaborative calibration coefficient (A,0) and the individual calibration coefficient (A,0). Specifically, the update coefficient (A) is calculated as follows.

Update coefficient (A)=corrected collaborative calibration coefficient (A,0)/individual calibration coefficient (A,0)=1.36/1.0=1.36

(Step 7: Acquisition of Final Calibration Coefficient)

The base station 10A serving as the target base station calculates the final calibration coefficient (A,j) of each branch according to Formula 9. Specifically, when the individual calibration coefficient (A,j) and the update coefficient (A) have been obtained, the base station 10A calculates the final calibration coefficient (A,j) of each branch as follows.

Final Calibration Coefficient $$(A, 0) = \text{individual calibration coefficient } (A, 0) *$$
$$\text{update coefficient } (A) = 1.0 * 1.36 = 1.36$$

$$(A, 1) = \text{individual calibration coefficient } (A, 1) *$$
$$\text{update coefficient } (A) = 0.6 * 1.36 \approx 0.82$$

$$(A, 2) = \text{individual calibration coefficient } (A, 2) *$$
$$\text{update coefficient } (A) = 2.2 * 1.36 \approx 2.99$$

5. Conclusion

As described above, the base station 10 according to an embodiment of the present invention can acquire and update the calibration coefficient for CoMP by adjusting the individual calibration coefficient acquired by individually performing branch calibration to match the individual calibration coefficient of another base station.

The preferred embodiments of the present invention have been described above in detail with reference to the accompanying drawings, whilst the technical scope of the present disclosure is not limited to the above examples, of course. A person skilled in the art may find various alternations and modifications within the scope of the appended claims, and it should be understood that they will naturally come under the technical scope of the present disclosure.

For example, steps of the processes of the base station 10 of the present disclosure need not necessarily be processed in time series according to an order described as a flowchart. For example, steps of the processes of the base station 10 of the present disclosure may be processed in an order different from an order described as a flowchart or in parallel.

Further, a computer program may be created that causes hardware, which is installed in the base station 10 such as a central processing unit (CPU), a read only memory (ROM), and a random access memory (RAM) to perform functions equivalent to the components of the base station 10. Further, a storage medium storing the computer program is also provided.

REFERENCE SIGNS LIST

10 base station
20 communication terminal
110 analog unit
120 backhaul communication unit
150 digital unit
160 demodulation processing unit
164 transfer function acquiring unit
170 modulation processing unit
172 calibration coefficient multiplying unit
180 upper layer unit
182 calibration coefficient acquiring unit
184 calibration coefficient adjusting unit
186 calibration coefficient update unit
190 storage unit

The invention claimed is:

1. A base station, comprising:
a plurality of branches that perform CoMP transmission with another base station; and
circuitry configured to multiply a transmission signal from each of the plurality of branches by a calibration coefficient of each of the plurality of branches,
wherein the calibration coefficient of each of the plurality of branches is a coefficient obtained by adjusting an individual calibration coefficient of each of the plurality of branches acquired by branch calibration between the plurality of branches in the base station based on an adjustment coefficient obtained by dividing a collaborative calibration coefficient of the branch of the base station by the individual calibration coefficient of the branch of the base station, the collaborative calibration coefficient being acquired by branch calibration between the branch of the base station and a branch of the another base station, and
wherein the collaborative calibration coefficient is acquired by dividing a reference forward loop-back transfer function by a reference backward loop-back transfer function, the reference forward loop-back transfer function being acquired by transmitting a radio signal from a first reference branch of a communication terminal to a second reference branch of the base station and a third reference branch of the another base station, and the reference backward loop-back transfer function being acquired by transmitting the radio signal from the second reference branch and the third reference branch to the first reference branch.

2. The base station according to claim 1,
wherein the calibration coefficient of each of the plurality of branches is a value obtained by multiplying the individual calibration coefficient of each of the plurality of branches by the adjustment coefficient.

3. A base station, comprising:
a plurality of branches that perform CoMP transmission with another base station; and
circuitry configured to:
store a calibration coefficient for each of the plurality of branches; and
multiply a transmission signal from each of the plurality of branches by the calibration coefficient,
wherein the calibration coefficient of each of the plurality of branches is updated by adjusting an individual calibration coefficient of each of the plurality of branches acquired by branch calibration between the plurality of branches in the base station based on an adjustment coefficient obtained by dividing a collaborative calibration coefficient of the branch of the base station by the individual calibration coefficient of the branch of the base station, the collaborative calibration coefficient being acquired by branch calibration between the branch of the base station and a branch of the another base station, and
wherein the collaborative calibration coefficient is acquired by dividing a reference forward loop-back transfer function by a reference backward loop-back transfer function, the reference forward loop-back transfer function being acquired by transmitting a radio signal from a first reference branch of a communication terminal to a second reference branch of the base station and a third reference branch of the another base station, and the reference backward loop-back transfer function being acquired by transmitting the radio signal from the second reference branch and the third reference branch to the first reference branch.

4. The base station according to claim 3,
wherein the calibration coefficient of each of the plurality of branches is updated by adjusting the individual calibration coefficient of each of the plurality of branches based on an update coefficient obtained by branch calibration between a branch of the base station and a branch of the other base station,
the update coefficient is a coefficient obtained by multiplying the adjustment coefficient by a correction coefficient, and
the correction coefficient is a coefficient changing the collaborative calibration coefficient of the branch of the another base station acquired by branch calibration between the branch of the base station and the branch of the another base station to be a current in-use collaborative calibration coefficient of the branch of the another base station.

5. A communication system, comprising:
a plurality of base stations,
each of the plurality of base stations including:
a plurality of branches that perform CoMP transmission with another base station, and
circuitry configured to multiply a transmission signal from each of the plurality of branches by a calibration coefficient of each of the plurality of branches,
wherein the calibration coefficient of each of the plurality of branches is a coefficient obtained by adjusting an individual calibration coefficient of each of the plurality of branches acquired by branch calibration between the plurality of branches in the base station based on an adjustment coefficient obtained by dividing a collaborative calibration coefficient of the branch of the base station by the individual calibration coefficient of the branch of the base station, the collaborative calibration coefficient being acquired by branch calibration between the branch of the base station and a branch of the another base station, and
wherein the collaborative calibration coefficient is acquired by dividing a reference forward loop-back transfer function by a reference backward loop-back transfer function, the reference forward loop-back transfer function being acquired by transmitting a radio signal from a first reference branch of a communication terminal to a second reference branch of the base station and a third reference branch of the another base station, and the reference backward loop-back transfer function being acquired by transmitting the radio signal from the second reference branch and the third reference branch to the first reference branch.

6. A communication system, comprising:
a plurality of base stations,
each of the plurality of base stations including:
a plurality of branches that perform CoMP transmission with another base station, and circuitry configured to:
store a calibration coefficient for each of the plurality of branches, and
multiply a transmission signal from each of the plurality of branches by the calibration coefficient,
wherein the calibration coefficient of each of the plurality of branches is updated by adjusting an individual calibration coefficient of each of the plurality of branches acquired by branch calibration between the plurality of branches in the base station based on an adjustment coefficient obtained by dividing a collaborative calibration coefficient of the branch of the base station by the individual calibration coefficient of the branch of the base station, the collaborative calibration coefficient being acquired by branch calibration between the branch of the base station and a branch of the another base station, and
wherein the collaborative calibration coefficient is acquired by dividing a reference forward loop-back transfer function by a reference backward loop-back transfer function, the reference forward loop-back transfer function being acquired by transmitting a radio signal from a first reference branch of a communication terminal to a second reference branch of the base station and a third reference branch of the another base station, and the reference backward loop-back transfer function being acquired by transmitting the radio signal from the second reference branch and the third reference branch to the first reference branch.

7. A communication method, comprising:
acquiring, by each of a plurality of base stations, each of which includes a plurality of branches and performs CoMP transmission with another base station, an individual calibration coefficient corresponding to each of the plurality of branches by performing a branch calibration between the plurality of branches in the base station;
acquiring a collaborative calibration coefficient of the branch of the base station by performing branch calibration between the branch of the base station and a branch of the another base station;
acquiring an adjustment coefficient by dividing the collaborative calibration coefficient of the branch of the base station by the individual calibration coefficient of the branch of the base station;
acquiring a calibration coefficient of each of the plurality of branches by adjusting the individual calibration coefficient corresponding to each of the plurality of branches based on the adjustment coefficient; and
multiplying a transmission signal from each of the plurality of branches of the base station by the calibration coefficient of each of the plurality of branches,
wherein the collaborative calibration coefficient is acquired by dividing a reference forward loop-back transfer function by a reference backward loop-back transfer function, the reference forward loop-back transfer function being acquired by transmitting a radio signal from a first reference branch of a communication terminal to a second reference branch of the base station and a third reference branch of the another base station, and the reference backward loop-back transfer function being acquired by transmitting the radio signal from the second reference branch and the third reference branch to the first reference branch.

8. The base station according to claim 1,
wherein the individual calibration coefficient is acquired by dividing a reference forward loop-back transfer function for the individual calibration coefficient by a reference backward loop-back transfer function for the individual calibration coefficient, the reference forward loop-back transfer function for the individual calibration coefficient being acquired by transmitting a radio signal from a reference branch of the plurality of branches to other branches of the plurality of branches, and the reference backward loop-back transfer function for the individual calibration coefficient being acquired by transmitting the radio signal from the other branches to the reference branch.

9. The base station according to claim 3,
wherein the individual calibration coefficient is acquired by dividing a reference forward loop-back transfer function for the individual calibration coefficient by a reference backward loop-back transfer function for the individual calibration coefficient, the reference forward loop-back transfer function for the individual calibration coefficient being acquired by transmitting a radio signal from a reference branch of the plurality of branches to other branches of the plurality of branches, and the reference backward loop-back transfer function for the individual calibration coefficient being acquired by transmitting the radio signal from the other branches to the reference branch.

* * * * *